United States Patent
Kumar et al.

(10) Patent No.: US 12,436,962 B2
(45) Date of Patent: Oct. 7, 2025

(54) MULTI-MODEL AND CLUSTERING DATABASE SYSTEM

(71) Applicant: Dell Products L.P., Round Rock, TX (US)

(72) Inventors: Dhilip S. Kumar, Bangalore (IN); Lokesh Dasam, Khammam (IN)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 17/546,337

(22) Filed: Dec. 9, 2021

(65) Prior Publication Data

US 2023/0185817 A1   Jun. 15, 2023

(51) Int. Cl.
*G06F 16/2458* (2019.01)
*G06F 16/2453* (2019.01)
*G06F 16/2455* (2019.01)
*G06F 16/28* (2019.01)

(52) U.S. Cl.
CPC .... *G06F 16/2471* (2019.01); *G06F 16/24542* (2019.01); *G06F 16/24556* (2019.01); *G06F 16/285* (2019.01)

(58) Field of Classification Search
CPC .............. G06F 16/2471; G06F 16/285; G06F 16/24556; G06F 16/24542
See application file for complete search history.

(56) References Cited

U.S. PATENT DOCUMENTS

| | | | | |
|---|---|---|---|---|
| 10,275,400 | B1* | 4/2019 | Newman | G06F 16/256 |
| 2002/0120685 | A1* | 8/2002 | Srivastava | G06F 16/958 |
| | | | | 715/255 |
| 2005/0192970 | A1* | 9/2005 | Chou | G06F 16/256 |
| 2007/0219972 | A1* | 9/2007 | Cragun | G06F 16/2471 |
| 2016/0098425 | A1* | 4/2016 | Brunswig | G06F 16/254 |
| | | | | 707/607 |
| 2017/0331920 | A1* | 11/2017 | Iqbal | H04L 41/20 |
| 2019/0303380 | A1* | 10/2019 | Hyde | G06F 16/2365 |
| 2019/0325292 | A1* | 10/2019 | Remis | G06F 16/9024 |
| 2019/0377713 | A1* | 12/2019 | Lankford | G06F 16/2379 |
| 2021/0311636 | A1* | 10/2021 | Ben Dayan | G06F 3/0604 |

(Continued)

OTHER PUBLICATIONS

"KSwSVR: A New Load Forecasting Method for Efficient Resources Provisioning in Cloud", 2013 IEEE 10th International Conference on Services Computing (Year: 2013).*

(Continued)

*Primary Examiner* — Apu M Mofiz
*Assistant Examiner* — Farhad Agharahimi
(74) *Attorney, Agent, or Firm* — Ryan, Mason & Lewis, LLP

(57) ABSTRACT

Techniques are disclosed for enabling a multi-model and clustering database system. For example, a query from a client is received at a primary cluster in a clustering database system implemented over one or more processing platforms. The primary cluster analyzes the query to determine an intent of the query and, based on the intent of the query, to identify at least one secondary cluster from a plurality of secondary clusters in the clustering database system to execute the query. The primary cluster manages the plurality of secondary clusters, and one or more of the plurality of secondary clusters support a data model type that is different than a data model type of one or more others of the plurality of secondary clusters.

20 Claims, 18 Drawing Sheets

(56) References Cited

U.S. PATENT DOCUMENTS

| | | | |
|---|---|---|---|
| 2022/0075780 A1* | 3/2022 | Zhou | G06F 16/245 |
| 2023/0153325 A1* | 5/2023 | Ceesay | G06N 7/01 |
| | | | 707/610 |
| 2023/0161792 A1* | 5/2023 | Pandis | G06F 16/27 |
| | | | 707/718 |

OTHER PUBLICATIONS

A. Panwar, "Types of Database Management Systems," https://www.c-sharpcorner.com/UploadFile/65fc13/types-of-database-management-systems/, Jun. 9, 2021, 9 pages.

Learn Computer Science, "Database Keys," https://www.learncomputerscienceonline.com/database-keys/, Accessed Jun. 15, 2021, 41 pages.

C. Sherman, "Designing a Cassandra Data Model," shermandigital.com, Apr. 26, 2017, 16 pages.

Wikipedia, "Extract, Transform, Load," https://en.wikipedia.org/w/index.php?title=Extract,_transform,_load&oldid=1021911882, May 7, 2021, 9 pages.

A. Amir, "Pattern Matching Algorithms," CS 663, Lecture #2, Sep. 1, 2010, 9 pages.

P. Kononow, "Metadata in Relational Databases (RDBMS)" https://dataedo.com/kb/databases/all/metadata, Sep. 30, 2018, 3 pages.

Stitch Data, "OLTP and OLAP: A Practical Comparison," https://www.stitchdata.com/resources/oltp-vs-olap/#:~:text=OLTPandOLAP%3A, Accessed May 20, 2021, 6 pages.

U.S. Appl. No. 17/363,737 filed in the name of Dhilip S. Kumar et al. on Jun. 30, 2021, and entitled "Database Gateway with Machine Learning Model."

* cited by examiner $$x_k = Ax_{k-1} + Bu_{k-1} + w_{k-1},$$

WITH A MEASUREMENT $z$ THAT IS $$z_k = Hx_k + v_k,$$

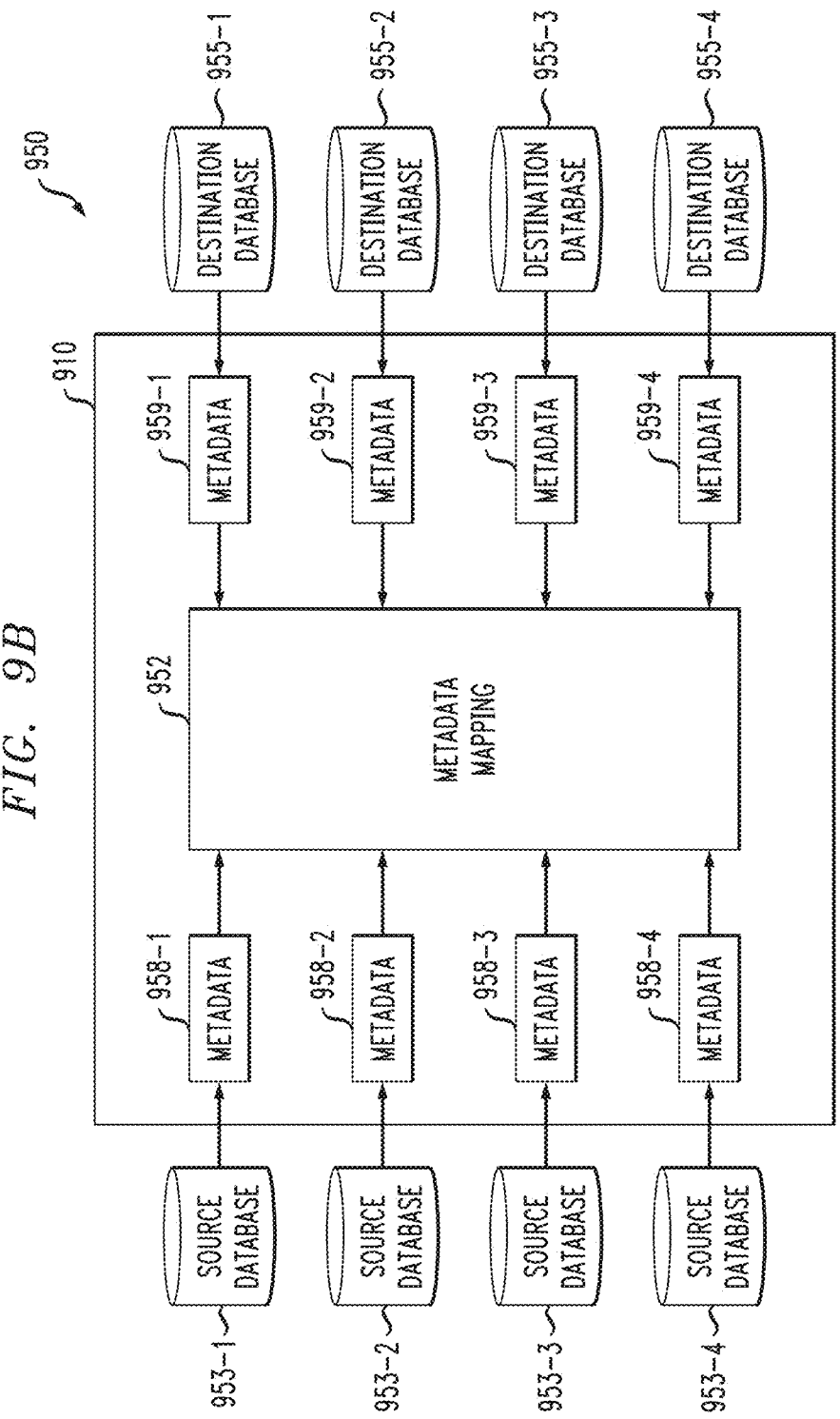

*FIG. 10C*

```
import pymongo myclient = pymongo.MongoClient("mongodb://localhost:27017/")
mydb = myclient["lokesh"]
mycol = mydb["test1"]

mydict = { "NAME": "John", "ADDRESS": "Highway 37", "CITY": "Texas","Location":"USA"} x = mycol.insert_one(mydict)
myclient.close()
```

*FIG. 10D* lokesh.test1

Documents    Aggregations    Schema    Explain Pla

FILTER  { field: 'value' }

ADD DATA    VIEW

_id: objectId("60ffea4dd885cbc37176e0fc")
NAME: "John"
ADDRESS: "Highway 37"
CITY: "Texas"

_id: objectId("60ffed0ad885cbc37176e0ff")
NAME: "John"
ADDRESS: "Highway 37"
CITY: "Texas"
LOCATION: "USA"

*FIG. 10E*

```
import pymongo
import cx_Oracle myclient = pymongo.MongoClient("mongodb://localhost:27017/")
mydb = myclient["lokesh"]
mycol = mydb["test1"]

con = cx_Oracle.connect('system/system@localhost/orcl.docker.internal')
cur = con.cursor()
curalt = con.cursor()

cur.execute('SELECT COLUMN_NAME FROM ALL_TAB_COLUMNS WHERE table_name=\'TEST1\'')
res = cur.fetchall()

for x in mycol.find():
    #print(type(x))
    for key, value in x.items():
        if key = "_id":
        chk=0
        for i in range(len(res)):
            par=(', '.join(res[i]))
            if par==key:
                chk=1
        if chek==0:
            print("Adding column ",key)
            curalt.execute('ALTER TABLE TEST1 ADD '+key+' VARCHAR2(100)')
```

FROM FIG. 10E cont.

FROM FIG. 10E

```
for x in mycol.find():
    #print(x)
    i=0
    col={}
    val={}
    for key, value in x.items():
        if key != "_id":
            col[i] =key
            val[i]=value
            i=i+1
    column=''
    value1=''
    cols=''
    vlas=''
    for x in range(i):
        #print(col[x], val[x])
        column=column+col[x]+','
        value1 = value1+'\"'+val[x]+'\"'+','
    cols=column.rstrip(',')
    vals=value1.rstrip(',')
    #print('INSERT INTO TEST1('+cols+') VALUES('+vals+')')
    curalt.execute('INSERT INTO TEST1('+cols+') VALUES('+vals+')')

curalt.close()
cur.close()
con.commit()
con.close()
myclient.close()
```

```
SELECT * FROM test1;
```

CT * FROM test1 | *Enter a SQL expression to filter results (use Ctrl+Space)*

| NAME | ADDRESS | CITY | LOCATION |
|---|---|---|---|
| John | Highway 37 | Texas | [NULL] |
| John | Highway 37 | Texas | USA |

*FIG. 11A* /1100

```
SELECT INDEX_NAME,TABLE_NAME,COLUMN_NAME FROM ALL_IND_COLUMNS WHERE table_name='TEST';
```

T INDEX_NAME,TABLE_NAME,COLUMN_NAME FRO | *Enter a SQL expression to filter results (use Ctrl+Space)*

| INDEX_NAME | TABLE_NAME | COLUMN_NAME |
|---|---|---|
| ID_NAME | TEST1 | NAME |

*FIG. 11B* /1110

Databases    Performance

CREATE DATABASE

| Databases Name ▲ |
|---|
| admin |
| config |
| local |

FIG. 11C ⟋ 1120

```
import cx_Oracle
import collections
import pymongo myclient = pymongo.MongoClient("mongodb://localhost:27017/")
mydb = myclient["lokesh"]
mycol = mydb["test1"]

con = cx_Oracle.connect('system/system@localhost/orcl.docker.internal')
cur = con.cursor()
cur1 = con.cursor()
odbcArray = []

cur.execute('select * from test1')
res = cur.fetchall()

cur1.execute('SELECT index_name,column_name FROM ALL_IND_COLUMNS WHERE table_name=\'TEST1\'')
res1 = cur1.fetchall()

ora_column_names = [col[0].lower() for col in cur.description]
mongo_rows = [dict(zip(ora_column_names, row)) for row in res]

x=mycol.insert_many(mongo_rows)

for i in range(len(res1)):
    par=(', '.join(res1[i]))
    #print(par)
    #print(par[0:par.find(',')],par[par.find(',')+1:Len(par)])
    idnam=par[0:par.find(',')]
    colnam=par[par.find(',')+1:len(par)]

mycol.create_index([(colnam, pymongo.ASCENDING )], name=idnam,
default_language='english')

cur.close()
cur1.close()
con.close()
myclient.close()
```

FIG. 11D lokesh.test1 /1130

Documents   Aggregations   Schema   Ex

○ FILTER  { field: 'value' }

ADD DATA ▼   VIEW  ≡  ||  ▦

_id: objectId("60fff162d885cbc37176e103")
name: "John"
address: "Highway 37"
city: "Texas"
location: null _id: objectId("60fff162d885cbc37176e104")
name: "John"
address: "Highway 37"
city: "Texas"
location: "USA"

Documents   Aggregations   Schema   Explain Plan   Indexes

Name and Definition ▲

ID_NAME
NAME ↑

_id_
_id ↑

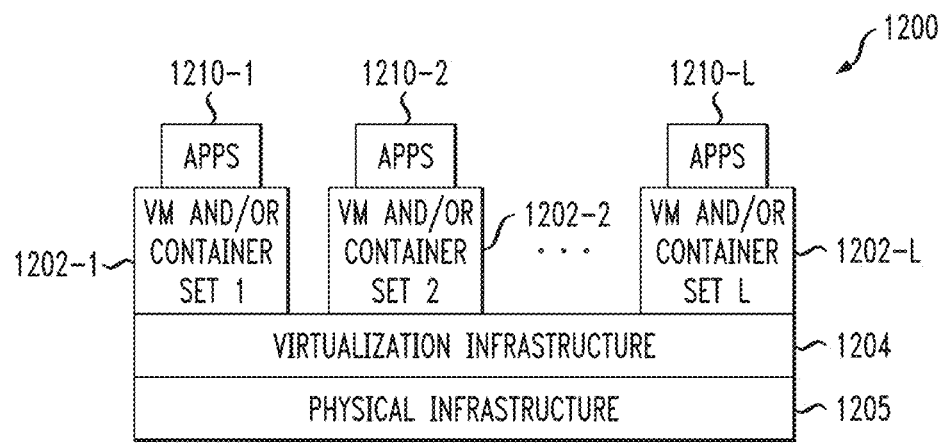
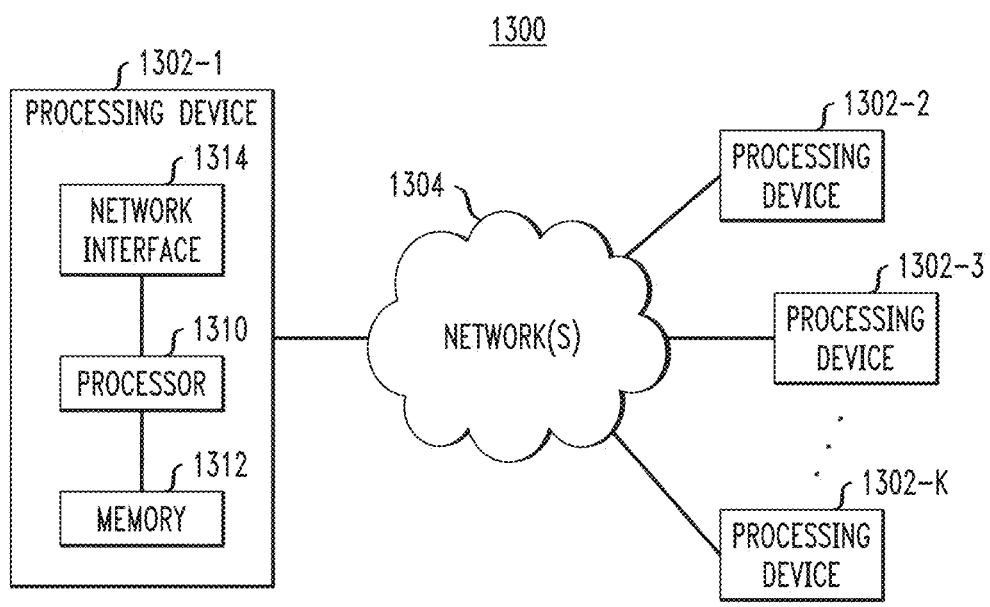

MULTI-MODEL AND CLUSTERING DATABASE SYSTEM

FIELD

The field relates generally to information processing systems, and more particularly to database management in such information processing systems.

BACKGROUND

Business organizations, as well as other entities, are undergoing a digital transformation in terms of the data that they generate, acquire, or otherwise maintain. One of the primary reasons for such a digital transformation is due to the vision of treating their data as an asset. The data associated with an entity is typically obtained from a wide variety of business and other processes that generate different types of data. As such, entities experience technical problems managing such different types of data and thus are unable to leverage benefits, e.g., performance, financial, etc., that the data could otherwise provide to the entities.

SUMMARY

Illustrative embodiments provide techniques for enabling a multi-model and clustering database system.

For example, in an illustrative embodiment, a method comprises the following steps. A query from a client is received at a primary cluster in a clustering database system implemented over one or more processing platforms. The primary cluster analyzes the query to determine an intent of the query and, based on the intent of the query, to identify at least one secondary cluster from a plurality of secondary clusters in the clustering database system to execute the query. The primary cluster manages the plurality of secondary clusters, and one or more of the plurality of secondary clusters support a data model type that is different than a data model type of one or more others of the plurality of secondary clusters.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable, inter alia, multi-model and clustering database techniques that can connect on-premises and cloud databases. A multi-model and clustering database, according to one or more illustrative embodiments, stores data such as, but not limited to, tabular data, relational data, columnar data, document data, graph data, key-value data, and non-relational data, as well as corresponding models, in a single database management environment and greatly facilitates adding and/or removing database types.

These and other illustrative embodiments include, without limitation, apparatus, systems, methods and computer program products comprising processor-readable storage media.

BRIEF DESCRIPTION OF THE DRAWINGS

FIGS. 9A and 9B illustrate a data pipeline processing architecture with an intelligent database gateway according to an illustrative embodiment.

FIGS. 10A through 10F illustrate a first data pipeline example according to an illustrative embodiment.

FIGS. 11A through 11E illustrate a second data pipeline example according to an illustrative embodiment.

FIGS. 12 and 13 respectively illustrate examples of processing platforms that may be utilized to implement multi-model and clustering database functionalities according to one or more illustrative embodiments.

DETAILED DESCRIPTION

Figure 1:
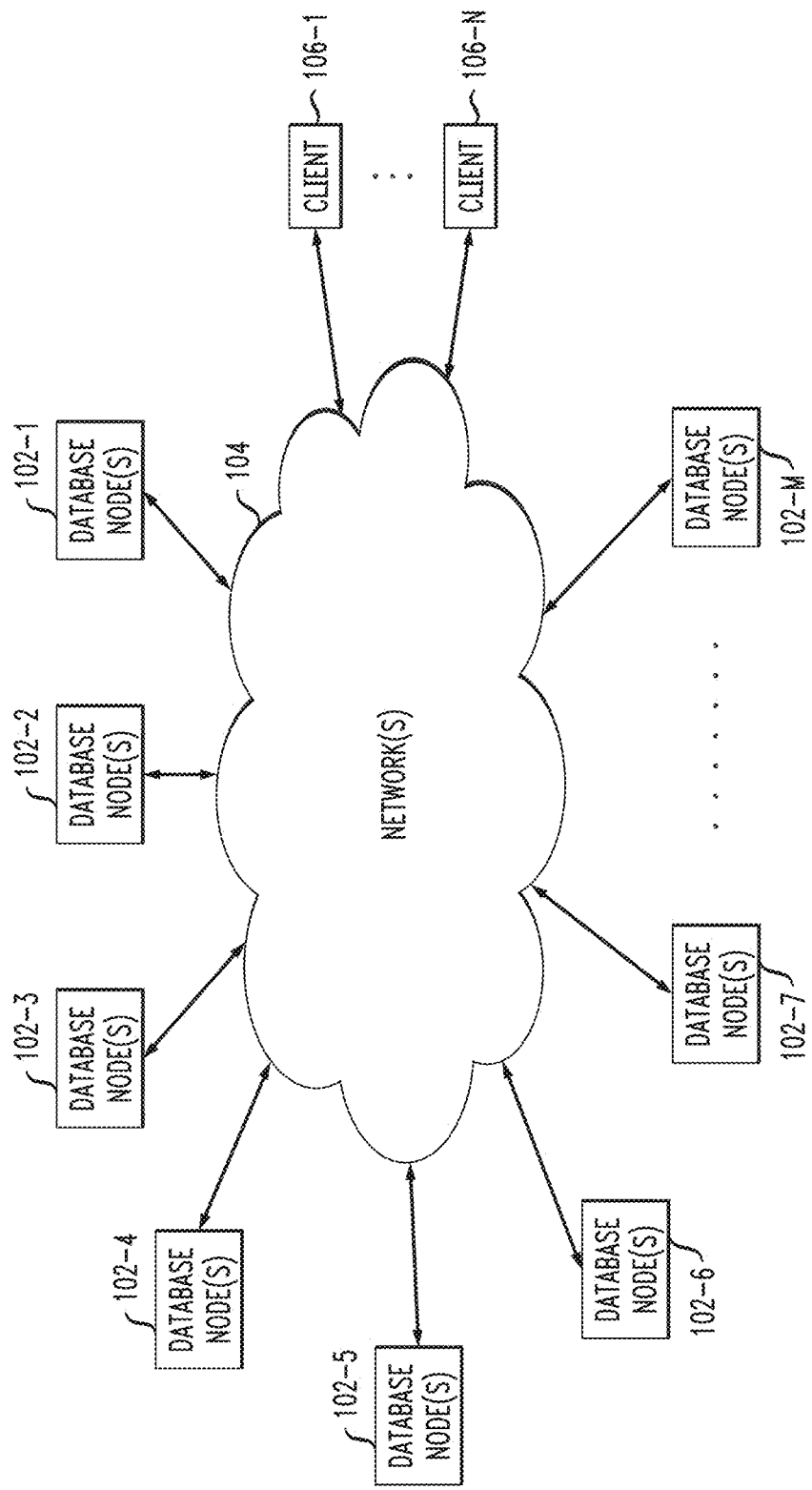
FIG. 1 illustrates an information processing system with which a multi-model and clustering database system according to one or more illustrative embodiments can be implemented.

Traditionally, organizations have typically used relational databases wherein day-to-day workloads are executed using Structured Query Language (SQL). However, so-called "Not only SQL" (NoSQL) databases have been developed to provide a mechanism for storage and retrieval of data modeled in forms other than the tabular relations used in relational databases. NoSQL databases come in a variety of types based on the given data model. For example, types of NoSQL data models include, but are not limited to, document, key-value, wide-column, and graph. These data models tend to provide flexible schemas and scale effortlessly with large amounts of data and high user loads.

Polyglot persistence refers to using different data storage technologies to handle varying data storage needs. It is an offshoot of polyglot programming, which means using other programming languages to build an application. Simply put, polyglot persistence is an application that uses more than one core database technology. The application layer interacts with these polyglot databases and abstracts the underlying database. However, it is just as important to use a suitable database for a given job, as each database has strengths and weaknesses for the given job based on its features/capabilities. Now that there are literally hundreds of database types available, it is difficult to enable the application layer to consider every available database.

A multi-model database attempts to replace the application layer by unifying the different types of the databases into a single database system that yields similar kinds of data. For example, graph/JSON/XML data structures are blended together at a higher level in a multi-model database. However, such a multi-model database approach may not take into account technical needs of a user.

It is realized herein that since current databases focus on a specific data type, an organization has to build a solid data pipeline to replicate the data from one type to another. Typically, this involves analyzing the data, creating the destination data model, generating a pipeline, and replicating the data. Such a focus leads to many technical problems, examples of which are described below.

For example, during the initial phase of an application, an architecture/design team typically only envisions one type of database. However, as product capabilities grow, there is a need for multiple database types. Thus, the team has to build a pipeline to replicate the data into new data types or models, or build the application layer to replicate the data. Unfortunately, the time the team spends with other database activities results in significant delays. This activity therefore adversely impacts expected productivity.

Further, organizations often decide to use one database over another in order to attempt to avoid or minimize issues with budget, cost, staffing, and priorities. To achieve product capabilities, the team typically has to build technical workarounds that often create performance bottlenecks. This activity therefore adversely impacts expected productivity and user experience.

Still further, once the expected database is identified, the team typically has to build a data migration strategy and ingestion strategy utilizing one or more data virtualization tools. This activity therefore adversely impacts expected productivity and product cost.

Also, once an organization decides to move at least some of its data from a data center that the organization hosts or otherwise controls (illustratively referred to herein as "on-prem," which is short for on-premises, or sometimes referred to as "private cloud") to a commercially available cloud platform that hosts multiple subscribing tenants in the same data center (illustratively referred to herein as "public cloud" or simply "cloud"), or vice versa (i.e., move data from cloud to on-prem), operational expenditure increases due to bottlenecks caused by multi-cloud data enablement. This activity therefore adversely impacts organization revenue and expenditure.

Current database approaches present many more technical problems that hamper progress and potentially cause the organization to view their data as a liability rather than as an asset. As mentioned above in the background section, a multi-model database approach may not take into account technical needs of a user (e.g., company, enterprise, organization, person, group, etc.) and thus limit options for the user. One reason for this drawback is that a multi-model database blends data and therefore optimization occurs at a high level.

In the case of an organization using a multi-model database, this may abstract performance in individual business areas. For example, each database model in a multi-model approach fulfills a specific organization use case. Data accumulated in one type of database may need significant extract, transform, load (ETL) processing. The ETL process brings complexity, needing significant compute power. The schema definition and index creation may also need manual intervention.

Illustrative embodiments overcome the above and other technical problems with existing databases by providing a multi-model and clustering database system that intelligently integrates and manages different data types and models. The advantageous multi-model and clustering database techniques can connect on-premises and cloud databases. A multi-model and clustering database, according to one or more illustrative embodiments, stores data such as, but not limited to, tabular data, relational data, columnar data, document data, graph data, key-value data, and non-relational data, as well as corresponding models, in a single database management environment and greatly facilitates adding and/or removing database types.

Furthermore, illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud (e.g., public cloud) and/or non-cloud (e.g., on-premises) computing and storage systems (computing platforms), as well as other types of processing systems comprising various combinations of physical and/or virtual processing resources.

FIG. 1 illustrates an information processing system 100 with which a multi-model and clustering database system according to one or more illustrative embodiments can be implemented. As generally shown, information processing system 100 comprises database node(s) 102-1, 102-2, 102-3, 102-4, 102-5, 102-6, 102-7, . . . , 102-M (collectively referred to as database nodes 102 or individually as database node 102) operatively coupled to a network(s) 104 along with a plurality of client (client devices) 106-1, . . . , 106-N (collectively referred to as clients 106 or individually as client 106). Network(s) 104 may comprise one or more data communication networks and protocols that enable database nodes 102 to operate collectively as a single database environment accessible by clients 106.

Note that each of the components labeled 102-1, 102-2, 102-3, 102-4, 102-5, 102-6, 102-7, . . . , 102-M are referred to as "database node(s)" since each component itself can be a plurality of nodes that comprise a database cluster such that information processing system 100 may be considered to illustrate a plurality of database clusters (i.e., 102 may be also referred to as a database cluster).

Database clusters and the notion of database clustering will be further explained herein in the context of subsequent figures. However, as is illustratively used here, the term database clustering (or clustering) refers to the ability of multiple nodes or instances to connect as a single database environment. The term instances illustratively refers to memory and processes that interact as part of a database and may be used interchangeably with the term nodes. By way of example, a cluster may comprise one or more nodes or instances. Note that one or more nodes or instances may be implemented on one or more physical computing devices (e.g., servers). It is to be further appreciated that a cluster may have at least one active node on which a production (or real-time) workload is executed, and at least one passive node that serves as a backup, standby or disaster node for an active node in the cluster in case of failure and/or the occurrence of some other condition.

Still further, in the context of multi-model database functionality according to one or more illustrative embodiments, one or more database nodes 102 (or database clusters) can be associated with a different database type (e.g., relational, graph, document, in-memory, etc.) as compared with one or more other database nodes 102 (or database clusters) in FIG. 1.

Information processing system 100, as will be explained in further detail herein, provides several other advantageous functionalities that enable a multi-model and clustering database system according to one or more illustrative embodiments.

For example, information processing system 100 can be configured with a database cluster registry functionality that collects metadata about the type of database in each given cluster with details such as high-level integration type, the supported SQL language, communication patterns, and on-premises and cloud cluster details.

Information processing system 100 can also be configured with a gateway functionality to authenticate a user (human and/or system) at the start of communication, as well as secure and abstract a database configuration assistant and its details.

Further, information processing system 100 is also configured to provide SQL analysis functionality wherein the database cluster intelligently analyzes the SQL, integrates with the appropriate database types, and serves the request. In one or more illustrative embodiments, a machine learning (ML) based algorithm is used to predict the load/performance of the query and auto-distribute the data.

Information processing system 100 can also be configured with a replication pipeline functionality which dynamically replicates the schema and data from one database type to another database type. The replication pipeline functionality leverages the behavior of write consistency and dynamic schema definition based on the source and destination type.

Still further, information processing system 100 is also configured to provide intelligent cluster functionality. For example, information processing system 100 may be considered a multi-cluster database, as explained above. In one or more illustrative embodiments, a cluster may be referred to as a primary cluster or a secondary cluster. A primary cluster, inter alia, manages the metadata of all types of databases, schema definition, and data replication status. Each secondary cluster contains, inter alia, schema definition data, as well as a data replication strategy for primary and disaster recovery, for its specific database type.

Advantageously, as will be further explained herein, illustrative embodiments provide a combination of a multi-model (also can be referred to as multi-modal) database in a multi-clustering platform that enables transactional, analytical, document, in-memory, and/or other database types, and search capabilities across cloud and on-premises use cases. The self-hosted pipelines auto-create the multi-schema models. The SQL analysis also selects the appropriate secondary cluster to execute the query and redirects the client to connect directly to the secondary cluster.

Figure 2:
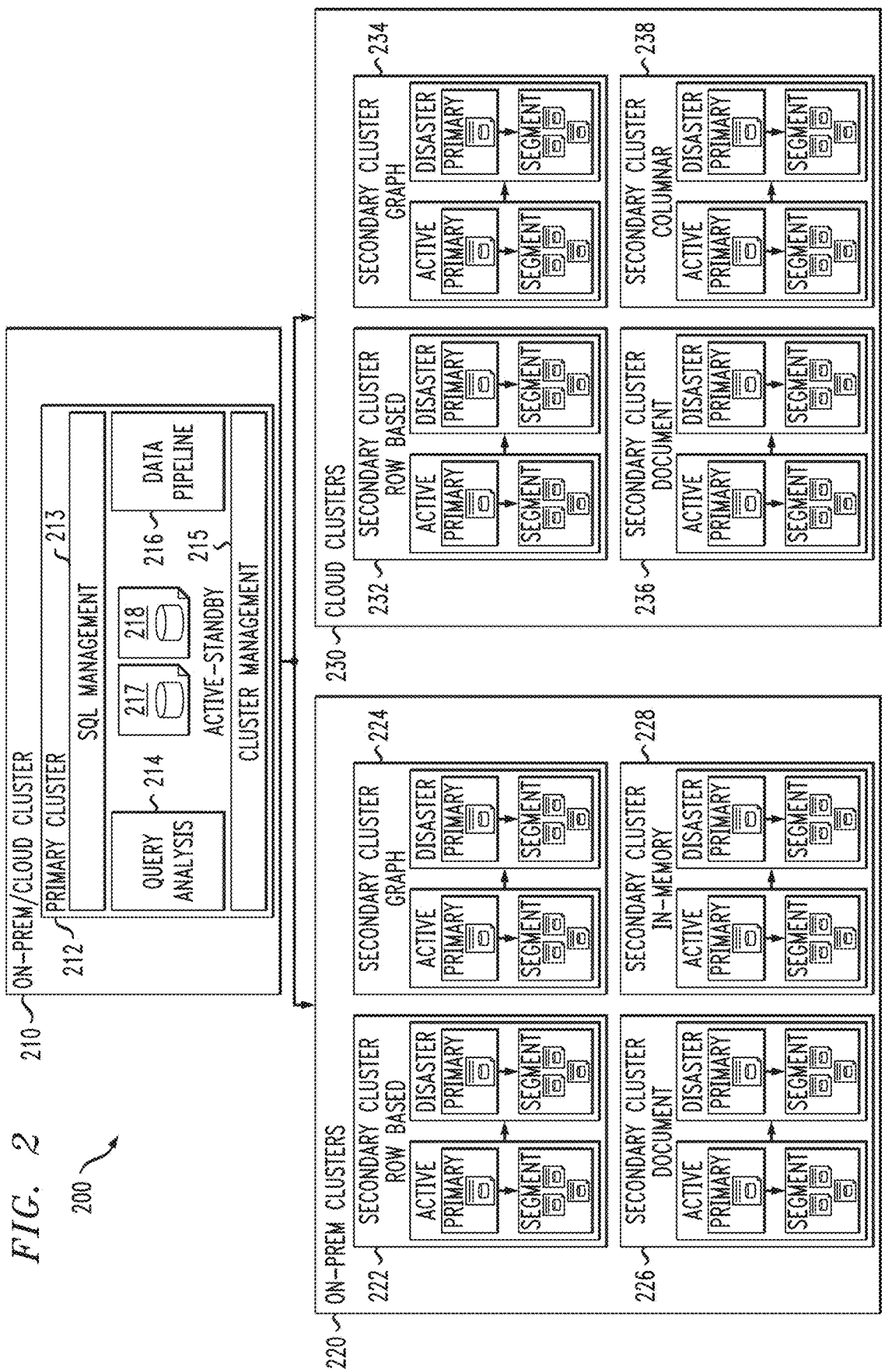
FIG. 2 illustrates a database clustering architecture according to an illustrative embodiment.

FIG. 2 illustrates a database clustering architecture 200, according to an illustrative embodiment, for enabling multi-model and clustering database functionalities to provide a single point of access for clients (e.g., 106 in FIG. 1 and/or other users/systems) to manage multiple types of databases and their data. The database clustering architecture 200 provides centralized query analysis and a multi-cluster database (database nodes 102/clusters in FIG. 1) distributed across on-premises clusters and cloud-based clusters to enable improved data management as compared with existing data management approaches. As will be further explained, these functionalities provide an ability to understand the intent of SQL and identify the correct database type that serves the request by creating a dynamic multi-model execution plan. That is, a database expert system is provided to enable the connected database system to execute the SQL with the client directly receiving the results, or the primary cluster aggregating, filtering, and/or joining the data and then providing it to the client.

More particularly, as shown, database clustering architecture 200 depicts a cluster 210 operatively coupled to clusters 220 and clusters 230.

Cluster 210 comprises a primary cluster 212, which itself comprises an SQL management module 213, a query analysis module 214, a cluster management module 215, and a data pipeline module 216, as will be further explained. Primary cluster 212 also comprises an active node 217 and a standby node 218. In an illustrative embodiment, database clustering architecture 200 is implemented on one or more non-cloud computing platforms (on-premises or on-prem), one or more cloud computing platforms, or some combination thereof. That is, cluster 210 and thus primary cluster 212, as shown, advantageously provide the ability to be implemented across the one or more on-premises computing platforms and/or the one or more cloud computing platforms.

Further, as shown, clusters 220 are on-premises clusters (implemented on the one or more on-premises computing platforms) comprising secondary clusters 222, 224, 226 and 228 wherein each secondary cluster corresponds to a different database type: secondary cluster 222 corresponds to row-based data, secondary cluster 224 corresponds to graph-based data, secondary cluster 226 corresponds to document-based data, and secondary cluster 228 corresponds to in-memory-based data. Each secondary cluster 222, 224, 226 and 228 comprises an active node and a disaster node.

Still further, as shown, clusters 230 are cloud clusters (implemented on the one or more cloud computing platforms) comprising secondary clusters 232, 234, 236 and 238 wherein each secondary cluster corresponds to a different database type: secondary cluster 232 corresponds to row-based data, secondary cluster 234 corresponds to graph-based data, secondary cluster 236 corresponds to document-based data, and secondary cluster 238 corresponds to in-memory-based data. Each secondary cluster 232, 234, 236 and 238 comprises an active node and a disaster node.

Cluster management in accordance with one or more illustrative embodiments is a key technical solution to existing technical problems in that such functionality provides the ability to have a primary cluster in the cloud and on-prem computing platforms.

More particularly, cluster management module 215 in primary cluster 212 is configured to register, add, and remove secondary clusters with on-prem and cloud details (e.g., on-prem clusters 220 comprising secondary clusters 222, 224, 226 and 228, and cloud clusters 230 comprising secondary clusters 232, 234, 236 and 238), as well as the type of database enabled in each of the secondary clusters (e.g., row, graph, document, in-memory, etc.).

Further, query analysis module 214 manages writing data to and reading data from the available type of database in each secondary cluster. Query analysis module 214 is also configured to maintain metadata for each secondary cluster database, as well as generate an execution plan before sending a request to the appropriate database type.

In addition, SQL management module 213 enables SQL application programming interfaces (APIs) for clients (e.g., 106 in FIG. 1) to authenticate and connect to the secondary clusters 222, 224, 226, 228, 232, 234, 236 and 238. SQL management module 213 also validates the syntax of the SQL statement, and passes the SQL statement to query analysis module 214.

Still further, data pipeline module 216 manages a process to auto-create the table/schema/key definitions to all available database types, as well as to replicate the data whenever a new database type cluster is added.

Accordingly, illustrative embodiments provide a multi-model database approach in the context of a database clustering environment by enabling and disabling secondary cluster databases with registry and de-registry in the primary cluster. This is an advantageous approach as compared to existing database capabilities. The nodes in the primary cluster keep the metadata about the database types and models of the secondary clusters. Also, an SQL query is analyzed and an optimal execution plan is generated based on the analysis. In one or more illustrative embodiments, this is achieved by implementing SQL management module 213 and query analysis module 214 as a machine learning-based expert system. In one illustrative embodiment, as will be further explained, query analysis module 214 is implemented using a Kalman smoother with support vector regression (KSwSVR) to predict the best possible (optimal) read while writing the data, and readjusting the data while reading the data as well. Cluster management module 215 creates a cluster registry and creates a client-to-server model to re-route the request based on the SQL analysis results received from query analysis module 214.

Furthermore, in addition to analyzing the SQL query intent, identifying the context, and connecting with the appropriate database for that SQL statement, the primary cluster redirects the SQL query to the client and/or aggregates the data in case the data of more than one cluster is needed to resolve the query.

Figure 3:
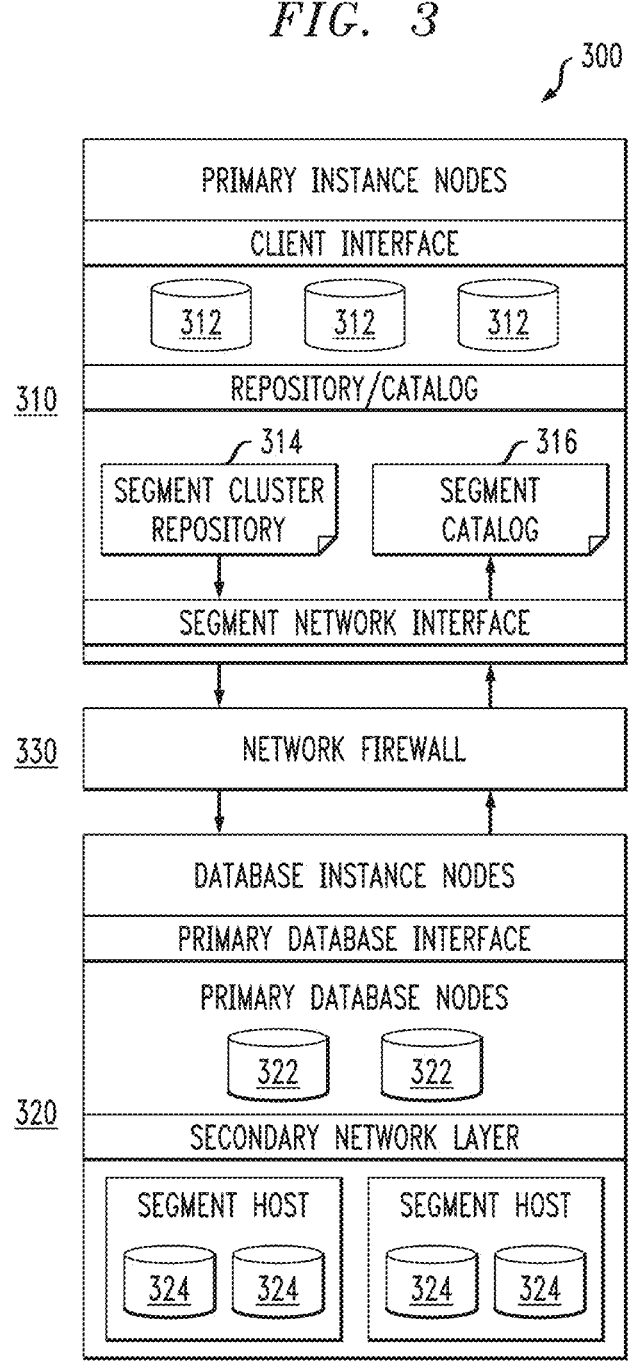
FIG. 3 illustrates a cluster management architecture according to an illustrative embodiment.

FIG. 3 further illustrates a cluster management architecture 300 according to an illustrative embodiment. More particularly, FIG. 3 depicts a primary cluster 310 and a secondary cluster 320 operatively coupled through a network firewall 330. Primary cluster 310 comprises primary nodes 312, a segment cluster repository 314 and a segment catalog 316. Secondary cluster 320 comprises its own primary nodes referred to as primary database nodes 322, as well as secondary database nodes 324 (e.g., one or more nodes per host device).

Primary cluster 310 is an entry point to the multi-model and clustering database system according to one or more illustrative embodiments. The database server process of primary cluster 310 accepts client connections (e.g., clients 106 in FIG. 1) and processes commands that clients issue. Each client (or other user) connects to the multi-model and clustering database system through one of primary nodes 312 of primary cluster 310 using an SQL/NoSQL agnostics program. Segment cluster repository 314 maintains details regarding secondary cluster 320 and other secondary clusters (not expressly shown) which are identified in segment catalog 316, as well as its own primary nodes 312. The secondary clusters, including secondary cluster 320, are considered the actual database where data is stored and, as shown for secondary cluster 320, each secondary cluster has its own primary database nodes 322 and secondary database nodes 324. Note that the term segment is used interchangeably with the term secondary in illustrative embodiments described herein.

Primary database nodes 322 of secondary cluster 320 sync with primary nodes 312 of primary cluster 310 for all the secondary cluster database metadata so that the client or user query can be analyzed upfront. Further, the client, primary nodes 312, and secondary database nodes 324 interact with the SQL statements. A primary node 312 authenticates the client details and analyzes which one (or more) of secondary database nodes 324 best fulfills the request. Based on the identification, the client session details are sent to the identified secondary database node 324. The secondary database node 324 stores the session and establishes the connection with the client, as well as sends the query details. The primary node 312 disconnects with the client and prepares for another statement. In this manner, the primary cluster 310 is able to load balance multiple client requests.

Note also that primary database nodes 322 serve to operatively couple secondary database nodes 324 for each host with primary cluster 310.

Figure 4:
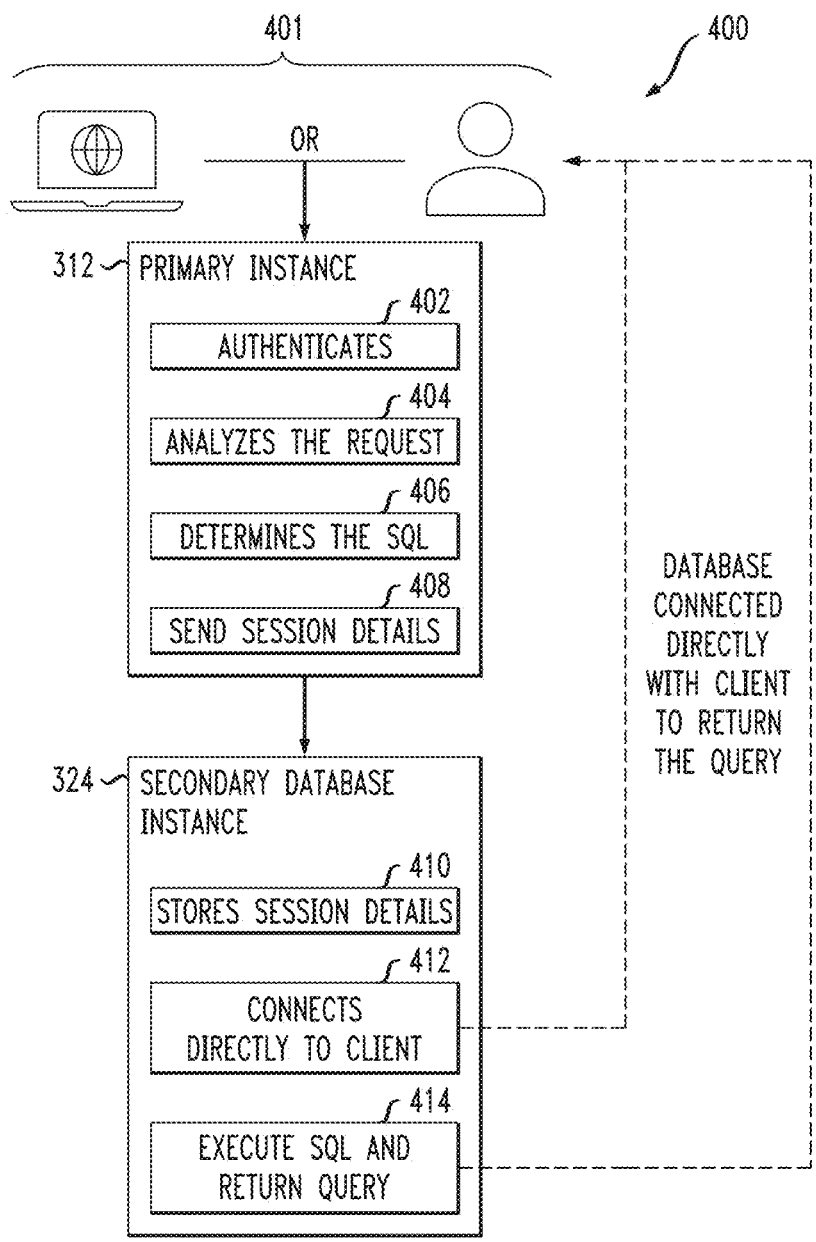
FIG. 4 illustrates a cluster management process according to an illustrative embodiment.

Process 400 in FIG. 4 shows the above steps performed by a primary instance, i.e., one of primary nodes 312, and a secondary database instance, i.e., one of secondary database nodes 324, for a query from a given client 401. More particularly, in step 402, primary node 312 authenticates a client 401 (user or other system) and, in step 404, analyzes the client request (SQL query). In step 406, the primary node 312 determines the SQL destination, i.e., the optimal secondary database node to handle the query and, in step 408, sends the session details top the optimal secondary database node, in this case, secondary database node 324. Secondary database node 324 then stores the received session details in step 410, connects directly to client 401 in step 412, and executes the SQL query and returns the query results to client 401 in step 414.

Figure 5:
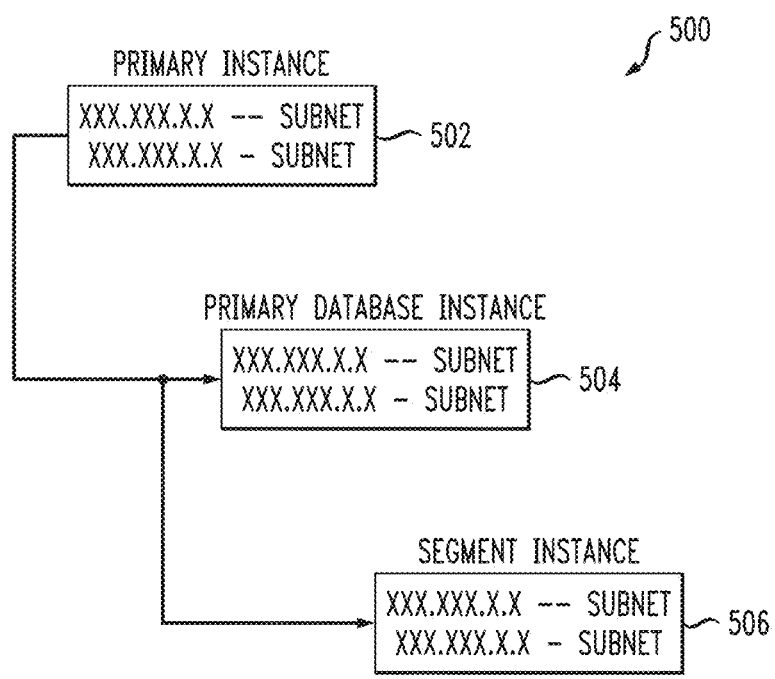
FIG. 5 illustrates an example network configuration for a cluster management architecture according to an illustrative embodiment.

FIG. 5 depicts an example network configuration 500 for communication between a primary instance 502 (i.e., primary node 312), a primary database instance 504 (e.g., primary database node 322), and a segment instance 506 (e.g., a secondary database node 324).

Turning now to query analysis functionality provided by a primary cluster (e.g., as part of query analysis module 214 in FIG. 2), illustrative embodiments provide a process that uses SQL to determine how to further optimize queries for performance. Query analysis is an advantageous aspect of query processing as it helps improve the overall performance of query processing, which will speed up many database functions and elements. In accordance with illustrative embodiments, query analysis also determines a specific database instance that can return optimized results.

Figure 6:
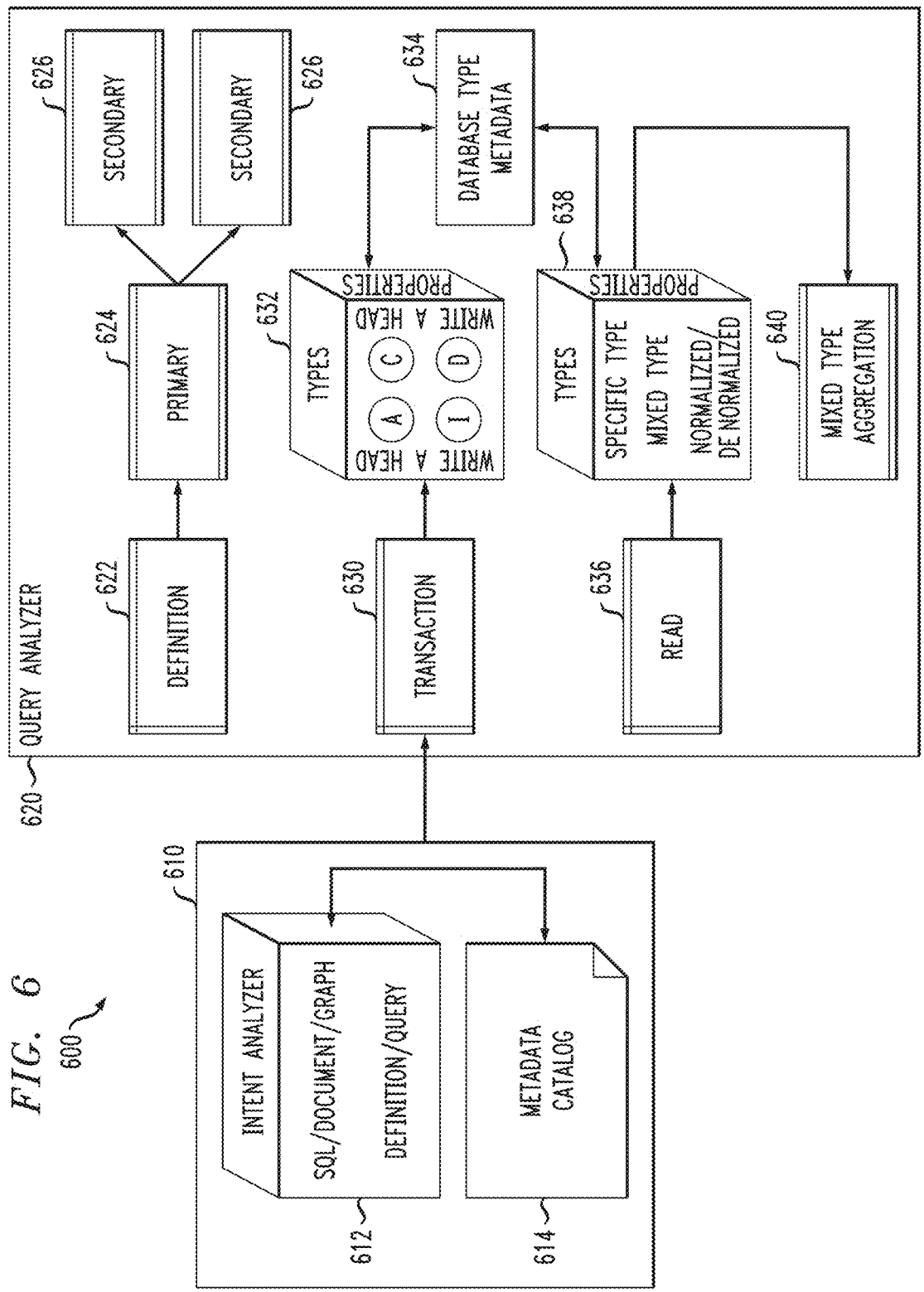
FIG. 6 illustrates a query analysis architecture according to an illustrative embodiment.

FIG. 6 illustrates a query analysis architecture 600 according to an illustrative embodiment. As will be explained in detail herein and as depicted in FIG. 6, query analysis functionality has two main portions comprising a query intent analysis performed by an query intent analysis module 610 and a query execution analysis performed by a query execution analysis module 620.

Query intent analysis module 610 comprises an intent analyzer 612 and a metadata catalog 614. Intent analyzer 612 identifies the query language using metadata catalog 614, and thereby identifies the basic database type (e.g., document, graph, SQL, key-value store, etc.) of the query. Metadata catalog 614 performs a synchronization process for any new type of database added to the primary cluster. Recall that the primary instance interfaces with the secondary database instances to obtain metadata about the SQL support. Advantageously, query intent analysis module 610 is able to determine the type of database intended for the given query.

Query execution analysis module 620 performs an execution analysis based on the query intent analysis. Recall that query intent analysis module 610 identifies the intended database type based on the query, e.g., document, key-value, graph, etc. Query intent analysis module 610 sends an intent output to query execution analysis module 620 so that optimal secondary database node can be identified and an execution plan determined. Note that a relation query utilizes an additional process to determine the type of data to serve the request, as will be further explained below.

As shown in FIG. 6, query execution analysis module 620 is configured to execute three types of analysis; data definition analysis, transaction request analysis, and read request analysis.

In data definition analysis 622, a primary type 624 and one or more secondary types 626 are identified and then respective definitions are prepared in accordance with a data pipeline module (e.g., 216 in FIG. 2)

In transaction request analysis 630, ACID (atomicity, consistency, isolation, durability) properties and write-ahead transaction logging 632 are applied to ensure data validity/integrity based on the type of the database identified by metadata 634.

Read request analysis 636 is used in query execution analysis module 620 when, for the specified database type of the query, a secondary database is asked to execute the query. A relational query identifies the database type 638 based on a pre-execution plan for normalized and de-normalized metadata. A mixed query identifies the respective database type and a pre-execution plan prepared as per the metadata, and an aggregation module 640 joins all the questions and returns the aggregated data to the client.

Multi-model databases comprise heterogeneous databases, making them challenging to manage piecewise, let alone as a whole. Furthermore, the scale, complexity, and growth rate of these databases render any heuristic and rule-based engine approach insufficient. It is also infeasible to forecast query load by modeling the behaviors of the various databases and their relationships to each other. In response to these technical problems, it is realized herein that statistics-based techniques for building gray or black-box models of query load can better guide query optimization. As such, illustrative embodiments provide for a two-stage prediction, i.e., a first stage during the writing of the data, and second stage based on a historical-based read query performance and service level agreement (SLA) compliance.

Figure 7:
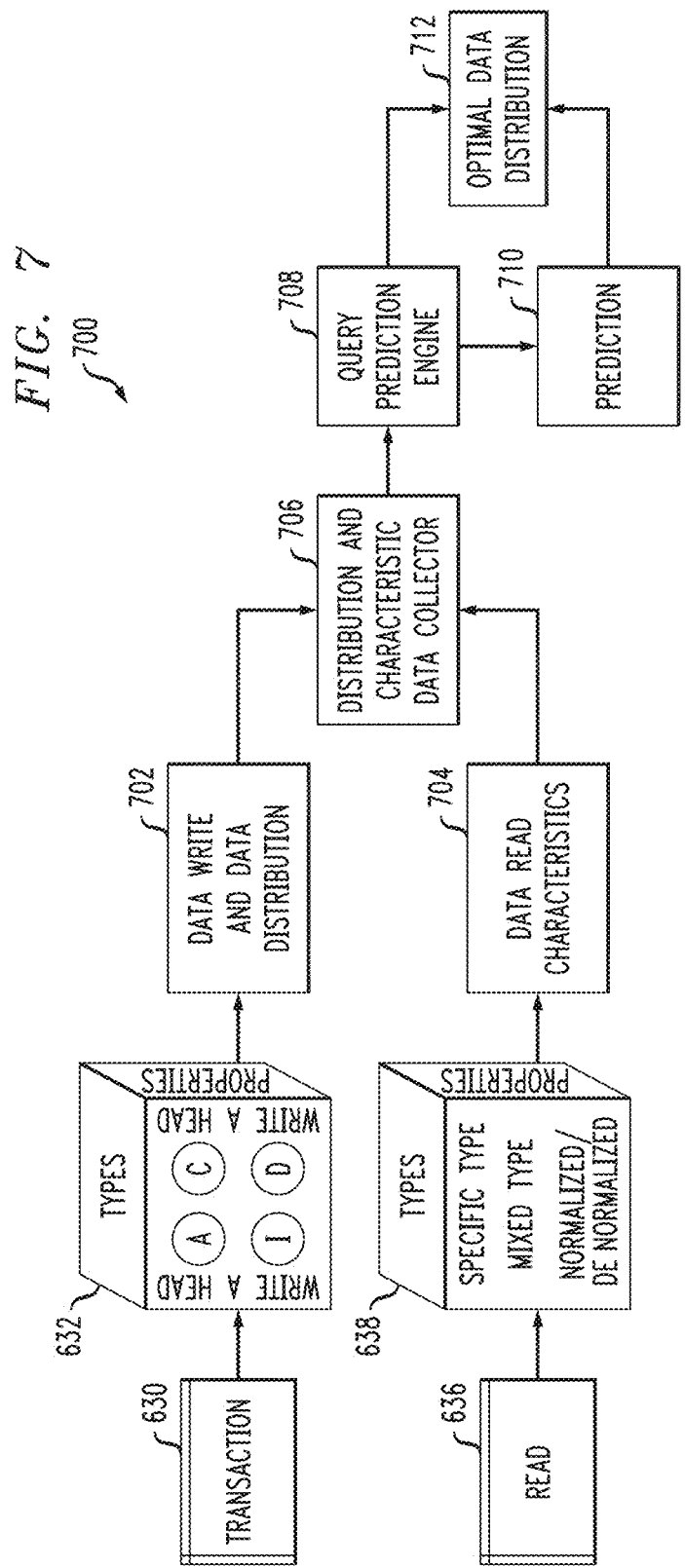
FIG. 7 illustrates a prediction processing architecture for query analysis according to an illustrative embodiment.

FIG. 7 illustrates a processing architecture 700 for the above-mentioned two stage prediction according to an illustrative embodiment. It is assumed that processing architecture 700 is implemented in query execution analysis module 620 in the illustrative embodiment. As shown, in transaction request analysis 630, after ACID properties and write-ahead transaction logging 632 are applied, data write and data distribution information 702 is generated. Similarly, in read request analysis 636, after database type 638 is identified, data read characteristic information 704 is generated. Data write and data distribution information 702 and data read characteristic information 704 are collected by data distribution and characteristic data collector module 706, and provided to query prediction engine 708 which yields prediction results 710. At least a portion of prediction results 710 are used by processing architecture 700 to generate an optimal data distribution 712.

In an illustrative embodiment, query prediction engine 708 implements a multi-step-ahead load prediction method, in the form of KSwSVR, which is based on a statistical learning technology, i.e., support vector regression (SVR), suitable for complex and dynamic characteristics. The KSwSVR approach is used for query prediction in this illustrative embodiment.

By way of example, query prediction engine 708 performs a multi-model database query performance forecasting method based on SVR. The multi-model-database load forecasting strategy gives more weight to high priority data (wherein "high priority" is data defined for a specific application to be important, critical, vital; desirable, etc.) instead of providing the same training data. To improve the prediction accuracy, a Kalman smoother is used for data pre-processing. The Kalman smoother was developed initially to estimate time-varying states in dynamic systems. In illustrative embodiments, the Kalman smoother is used to provide a filtering technique to eliminate the noise of a usage signal from the error of the measurement technique while still discovering its actual main fluctuations. One of the main advantages of the Kalman smoother filter is that it can estimate hidden parameters indirectly from measured data and can integrate data from as many measurements as are available in an approximately optimal way. The Kalman smoother filter estimates the state of a discrete-time controlled process governed by a linear stochastic difference equation 800 as defined in FIG. 8A.

In a time series of a nonstationary system, the dependency between input and output variables gradually changes over time. Specifically, recent past data could provide more critical information than the distant past data. Another factor that influences the importance of data is its credibility. In multi-model-database performance forecasting according to an illustrative embodiment, there are two types of data, i.e., measured data and predicted data. Measured data refers to the actual historical resource usage information collected by a system monitor. Directly taking the predicted value as the final query tunning value may lead to an unacceptable SLA violation since any prediction algorithm has an error range. Even the same algorithm will have different prediction errors as the prediction object changes. For various resources or the same resource at other times, allocating resources directly according to forecasting results cannot guarantee performance.

Therefore, a resource allocation mechanism based on load forecasting for two considerations helps to improve the system. First, data load spike, which will lead to under-provisioning, is difficult to predict for any prediction algorithm, especially in a dynamic data load. Second, in a distributed model, the user's query and requirements also can change at any time. A flexible mechanism to deal with different SLA levels is needed in this multi-tenant environment.

Figures 8A, 8B:
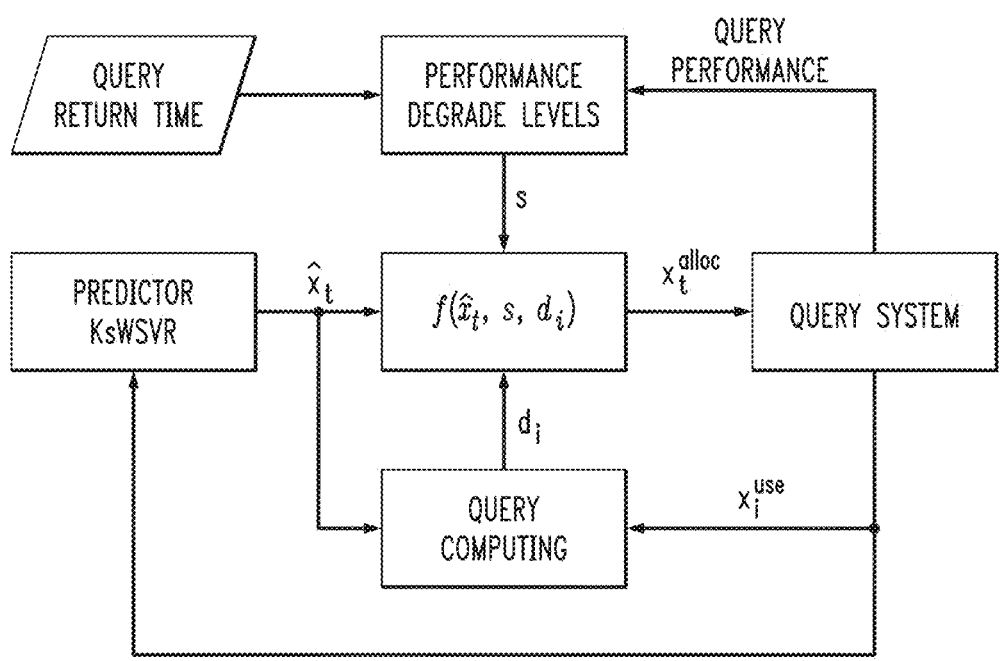
FIGS. 8A and 8B illustrate further details of a prediction processing architecture for query analysis according to an illustrative embodiment.

Referring to FIG. 8B, a flexible prediction mechanism 810 (e.g., for use in query prediction engine 708) is depicted. Variables $x_t^{use}$, $x_t^{\wedge}$ and $x_t^{alloc}$ respectively represent a natural resources usage value, a predicted value, and an actual resources allocation value at time t. With $d_t$, flexible prediction mechanism 810 uses the information of under-provisioning in the last k periods while ignoring over-provisioning. This allows the system to respond to load spikes quickly. An incremental coefficient s is highly correlated with performance. Its value depends on the gap between the actual application performance and SLA. The greater the gap, the bigger the s. A more significant s means allocating more resources and fewer SLA violations. The flexible prediction mechanism 810 is proactive (KSwSVR) as depicted in FIG. 8B.

Figure 9A:
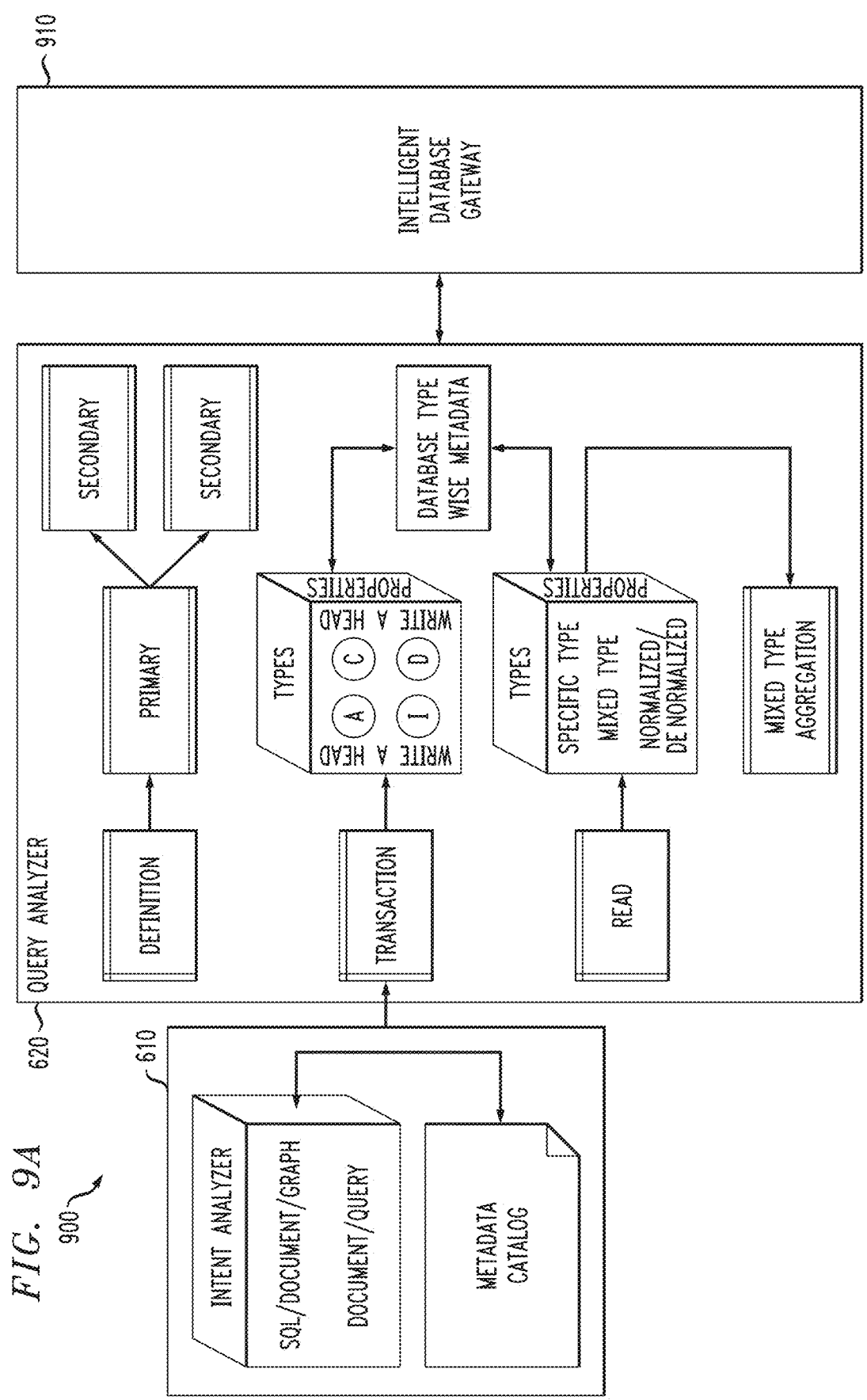

Recall that data pipeline module 216 manages a process to auto-create the table/schema/key definitions for all available database types, as well as to replicate the data whenever a new database type cluster is added. Using an intelligent database gateway, the data pipeline is trained to understand the source data pattern and creates the data files, types, and indexes. The distribution key is auto-identified based on machine learning and destination data based using metadata. FIG. 9A illustrates a processing architecture 900 with an intelligent database gateway 910 operatively coupled to query execution analysis module 620 which is operatively coupled to query intent analysis module 610.

FIG. 9B illustrates a processing architecture 950 with intelligent database gateway 910 according to an illustrative embodiment. As shown, intelligent database gateway 910 comprises a metadata mapping layer 952 which maps the metadata 958-1, 958-2, 958-3 and 958-4 (collectively "source metadata 958") from source databases 953-1, 953-2, 953-3 and 953-4 (collectively "source databases 953") to the metadata 959-1, 959-2, 959-3 and 959-4 (collectively "destination metadata 959") from destination databases 955-1, 955-2, 955-3 and 955-4 (collectively "destination databases 955"). The metadata mapping layer 952 receives the collected source and destination metadata 958 and 959 from the source and destination databases 953 and 955, and maps the source metadata 958 to the destination metadata 959 in order to map available data types of the source databases 953 to the available data types of the destination databases 955. The source and destination data types are mapped based on data type names identified from the source and destination metadata 958 and 959. The data types of the different databases 953 and 955 are mapped by the metadata mapping layer 952. When data is flowing from one or more of the databases 953 and 955, defined data types of the databases 953 and 955 are identified.

Two examples below demonstrate how data pipeline module 216 can handle syncing a document database and an relational database management system (RDBMS) in real-time with a bidirectional data stream.

Example 1

Consider a scenario with a database with two child nodes, e.g., MongoDB and Oracle, user data is streaming into MongoDB, and this data is synchronized into Oracle in real-time. The data pipeline module 216 handles any extra fields detected in the Mongo document and automatically adds columns into the Oracle database.

Further assume table test1 and collection test1 already exist in both databases.

Figure 10A:
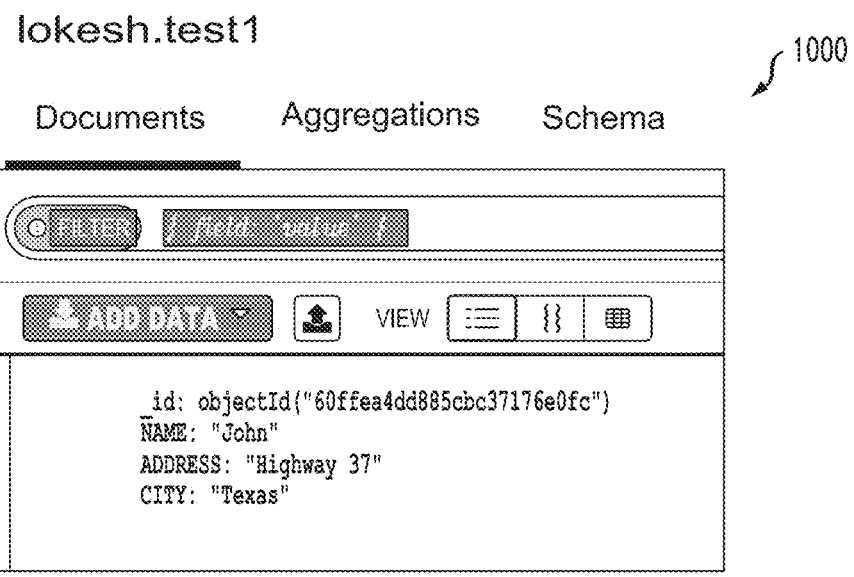
Figure 10B:
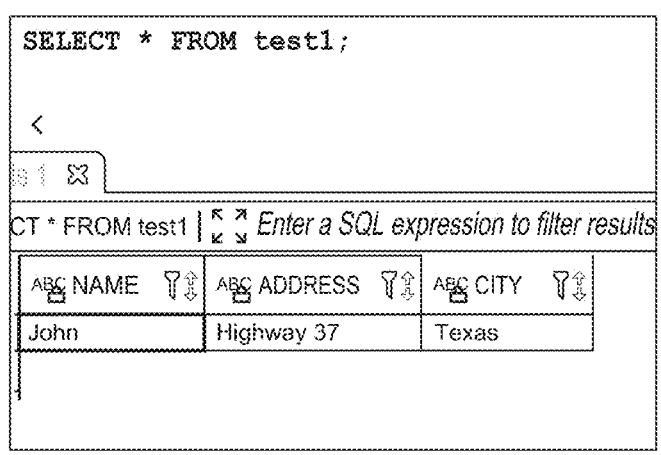

The Mongo collection with one document is shown as a snapshot 1000 in FIG. 10A. The Oracle table with the same data is shown as a snapshot 1010 in FIG. 10B.

A new document is inserted with an extra field LOCATION in Mongo by using a code snippet 1020 in FIG. 10C and as shown in a snapshot 1030 in FIG. 10D.

This new document is inserted into Oracle. Before inserting a new row, the new field LOCATION is altered in the table. FIG. 10E shows a code snippet 1040 for the same.

After Oracle is altered, the new row is inserted with the new column as shown in a snapshot 1050 in FIG. 10F.

Example 2

This example is a reverse of Example 1 above, where new table data from Oracle will be synced to Mongo and dependencies. In this case, an index for the table is the dependent object.

Table test1 already exists in Oracle with an index ID NAME as shown in a snapshot 1100 in FIG. 11A. A snapshot 1110 in FIG. 11B shows there is no collection by name test1 in MongoDB.

The synchronization from Oracle-Mongo is processed using a code snippet 1120 in FIG. 11C. After the synchronization, FIG. 11D shows a snapshot 1130 of Mongo with a new collection test1, along with index ID NAME as shown in snapshot 1140 in FIG. 11E.

Illustrative embodiments of processing platforms that can implement the features of FIGS. 1-11E will now be described in greater detail with reference to FIGS. 12 and 13.

FIG. 12 shows an example processing platform comprising cloud infrastructure 1200. The cloud infrastructure 1200 comprises a combination of physical and virtual processing resources that may be utilized to implement at least a portion of an information processing system described herein. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components described herein may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of one or more systems described herein and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU)

or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and systems and processes described herein may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionalities of one or more modules of a multi-model and clustering database system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and database management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processor coupled to at least one memory, the at least one processor, when executing program code, is configured to:
   operate as a primary cluster in a clustering database system implemented over one or more processing platforms; and
   manage a plurality of secondary clusters, wherein the primary cluster comprises one or more primary database nodes and a database cluster registry of the plurality of secondary clusters, wherein each of the secondary clusters comprises one or more primary database nodes and one or more secondary database nodes;
   wherein the primary cluster is further configured to:
   generate the database cluster registry, the generating comprising:
   registering the plurality of secondary clusters to the clustering database system, the registration comprising replicating data corresponding to each of the plurality of secondary clusters at the database cluster registry as one or more datasets;
   automatically synchronizing the one or more primary database nodes of the primary cluster with the one or more primary database nodes of each of the plurality of secondary clusters to obtain metadata from each of the plurality of secondary clusters, wherein the obtained metadata comprises: a database type and a model of each of the plurality of secondary clusters, schema definition data for each of the plurality of secondary clusters, a replication status of the data corresponding to the registered plurality of secondary clusters of the plurality of secondary clusters, an integration type of each of the plurality of secondary clusters, a supported language of each of the plurality of secondary clusters, communication patterns of each of the plurality of secondary clusters, on premises context details and cloud cluster context details;
   maintaining the obtained metadata corresponding to each secondary cluster of the plurality of secondary clusters; and
   automatically creating definition data corresponding to all available database types of the database cluster registry based on the obtained metadata;
   add and remove one or more secondary clusters from the database cluster registry;
   receive a query from a client;
   authenticate the client, with the one or more primary database nodes of the primary cluster, using one or more client details;
   initiate a session for the client based on a positive result of the authentication;
   analyze the query to determine an intent of the query and a context of the query in the clustering database system in relation to the registered plurality of secondary clusters and, based on the intent and the context of the query, to identify at least one secondary cluster from the plurality of secondary clusters in the clustering database system to execute the query;
   utilize at least a portion of the obtained metadata when analyzing the query;

wherein the data associated with the query is a data type that differs from a data type associated with a database type of the identified at least one secondary cluster, utilize at least a portion of the obtained metadata to dynamically replicate one or more schemas based on the schema definition data and to dynamically replicate the one or more datasets at the primary cluster from a first database type to a second database type, wherein the schema definition data corresponds to the identified at least one secondary cluster, and wherein the second database type is the database type of the identified at least one secondary cluster;

send one or more details of the session to the identified at least one secondary cluster; and redirect the client to establish a connection between the client and the identified at least one secondary cluster;

wherein the one or more of the plurality of secondary clusters are configured to support a data model type that is different than a data model type of one or more others of the plurality of secondary clusters.

2. The apparatus of claim 1, wherein the primary cluster is further configured to:

send information to the identified at least one secondary cluster to enable the identified at least one secondary cluster to execute the query and send a query result to the client; and disconnect with the client that sent the query to prepare for receipt of a next query.

3. The apparatus of claim 1, wherein, when two or more secondary clusters are identified to execute the query, the primary cluster is further configured to:

aggregate query results from the two or more secondary clusters; and send the aggregated query results to the client.

4. The apparatus of claim 1, wherein the analysis of the query performed by the primary cluster comprises a query intent analysis to determine the intent of the query and a query execution analysis to determine the context of the query.

5. The apparatus of claim 4, wherein the query intent analysis determines the intent of the query by identifying a language associated with the query and a database type intended for the query.

6. The apparatus of claim 5, wherein, based on the query intent analysis, the query execution analysis identifies the at least one secondary cluster best suited to execute the query based on the context of the query.

7. The apparatus of claim 1, wherein the analysis of the query performed by the primary cluster comprises a data definition analysis, a transaction request analysis, and a read request analysis.

8. The apparatus of claim 1, wherein the analysis of the query performed by the primary cluster comprises predicting a query load for each of one or more of the plurality of secondary clusters and identifying the at least one secondary cluster to execute the query based on the prediction.

9. The apparatus of claim 8, wherein predicting a query load for each of one or more of the plurality of secondary clusters utilizes a statistical smoothing filter with a support vector regression functionality.

10. The apparatus of claim 9, wherein predicting a query load for each of one or more of the plurality of secondary clusters is performed during a data write operation and utilizes at least one of historical read query performance information and service level agreement performance information.

11. The apparatus of claim 1, wherein the primary cluster utilizes a machine learning-based gateway to perform the dynamic replication of the one or more schemas and the dynamic replication of the one or more datasets at the primary cluster.

12. The apparatus of claim 1, wherein the one or more processing platforms over which the clustering database system is implemented comprise a non-cloud computing platform and a cloud computing platform.

13. The apparatus of claim 1, wherein the plurality of secondary clusters are respectively configured to support a plurality of data models.

14. The apparatus of claim 13, wherein the plurality of data models comprise SQL and NoSQL data models.

15. A method comprising:

operating a primary cluster in a clustering database system implemented over one or more processing platforms, wherein the primary cluster is configured to manage a plurality of secondary clusters, wherein the primary cluster comprises one or more primary database nodes and a database cluster registry of the plurality of secondary clusters, and wherein each of the secondary clusters comprises one or more primary database nodes and one or more secondary database nodes, wherein the primary cluster is further configured to perform the method, further comprising:

generating the database cluster registry, the generating comprising:

registering the plurality of secondary clusters to the clustering database system, the registration comprising replicating data corresponding to each of the plurality of secondary clusters at the database cluster registry as one or more datasets;

automatically synchronizing the one or more primary database nodes of the primary cluster with the one or more primary database nodes of each of the plurality of secondary clusters to obtain metadata from each of the plurality of secondary clusters, wherein the obtained metadata comprises: a database type and a model of each of the plurality of secondary clusters, schema definition data for each of the plurality of secondary clusters, a replication status of the data corresponding to the registered plurality of secondary clusters of the plurality of secondary clusters, an integration type of each of the plurality of secondary clusters, a supported language of each of the plurality of secondary clusters, communication patterns of each of the plurality of secondary clusters, on premises context details and cloud cluster context details;

maintaining the obtained metadata corresponding to each secondary cluster of the plurality of secondary clusters; and automatically creating definition data corresponding to all available database types of the database cluster registry based on the obtained metadata;

adding and removing one or more secondary clusters from the database cluster registry;

receiving, at the primary cluster, a query from a client;

authenticating the client, with the one or more primary database nodes of the primary cluster, using one or more client details;

initiating a session for the client based on a positive result of the authentication;

analyzing, at the primary cluster, the query to determine an intent of the query and a context of the query in the clustering database system in relation to the registered plurality of secondary clusters and, based on the intent and the context of the query, to identify at least one secondary cluster from the plurality of secondary clusters in the clustering database system to execute the query;

utilizing, at the primary cluster, at least a portion of the obtained metadata when analyzing the query;

wherein the data associated with the query is a data type that differs from a data type associated with a database type of the identified at least one secondary cluster, utilizing at least a portion of the obtained metadata to dynamically replicate one or more schemas based on the schema definition data and to dynamically replicate the one or more datasets at the primary cluster from a first database type to a second database type, wherein the schema definition data corresponds to the identified at least one secondary cluster, and wherein the second database type is the database type of the identified at least one secondary cluster;

send one or more details of the session to the identified at least one secondary cluster; and redirect the client to establish a connection between the client and the identified at least one secondary cluster;

wherein one or more of the plurality of secondary clusters are configured to support a data model type that is different than a data model type of one or more others of the plurality of secondary clusters; and wherein the method is performed by at least one processor coupled to at least one memory configured to execute program code.

16. The method of claim 15, wherein the one or more processing platforms over which the clustering database system is implemented comprise a non-cloud computing platform and a cloud computing platform, the plurality of secondary clusters are respectively configured to support a plurality of data models, and the plurality of data models comprise SQL and NoSQL data models.

17. A computer program product comprising a non-transitory processor-readable storage medium having stored therein program code of one or more software programs, wherein the program code, when executed by at least one processor, cause the at least one processor to:

operate as a primary cluster in a clustering database system implemented over one or more processing platforms; and manage a plurality of secondary clusters, wherein the primary cluster comprises one or more primary database nodes and a database cluster registry of the plurality of secondary clusters, wherein each of the secondary clusters comprises one or more primary database nodes and one or more secondary database nodes;

wherein the primary cluster is further configured to:

generate the database cluster registry, the generating comprising:

registering the plurality of secondary clusters to the clustering database system, the registration comprising replicating data corresponding to each of the plurality of secondary clusters at the database cluster registry as one or more datasets;

automatically synchronizing the one or more primary database nodes of the primary cluster with the one or more primary database nodes of each of the plurality of secondary clusters to obtain metadata from each of the plurality of secondary clusters, wherein the obtained metadata comprises: a database type and a model of each of the plurality of secondary clusters, schema definition data for each of the plurality of secondary clusters, a replication status of the data corresponding to the registered plurality of secondary clusters of the plurality of secondary clusters, an integration type of each of the plurality of secondary clusters, a supported language of each of the plurality of secondary clusters, communication patterns of each of the plurality of secondary clusters, on premises context details and cloud cluster context details;

maintaining the obtained metadata corresponding to each secondary cluster of the plurality of secondary clusters; and automatically creating definition data corresponding to all available database types of the database cluster registry based on the obtained metadata;

add and remove one or more secondary clusters from the database cluster registry;

receive a query from a client;

authenticate the client, with the one or more primary database nodes of the primary cluster, using one or more client details;

initiate a session for the client based on a positive result of the authentication;

analyze the query to determine an intent of the query and a context of the query in the clustering database system in relation to the registered plurality of secondary clusters and, based on the intent and the context of the query, to identify at least one secondary cluster from the plurality of secondary clusters in the clustering database system to execute the query;

utilize at least a portion of the obtained metadata when analyzing the query;

wherein the data associated with the query is a data type that differs from a data type associated with a database type of the identified at least one secondary cluster, utilize at least a portion of the obtained metadata to dynamically replicate one or more schemas based on the schema definition data and to dynamically replicate the one or more datasets at the primary cluster from a first database type to a second database type, wherein the schema definition data corresponds to the identified at least one secondary cluster, and wherein the second database type is the database type of the identified at least one secondary cluster;

send one or more details of the session to the identified at least one secondary cluster; and redirect the client to establish a connection between the client and the identified at least one secondary cluster;

wherein one or more of the plurality of secondary clusters are configured to support a data model type that is different than a data model type of one or more others of the plurality of secondary clusters.

18. The computer program product of claim 17, wherein the one or more processing platforms over which the clustering database system is implemented comprise a non-cloud computing platform and a cloud computing platform, the plurality of secondary clusters are respectively configured to support a plurality of data models, and the plurality of data models comprise SQL and NoSQL data models.

19. The method of claim 15, wherein the primary cluster is further configured to:

send information to the identified at least one secondary cluster to enable the identified at least one secondary cluster to execute the query and send a query result to the client; and disconnect with the client that sent the query to prepare for receipt of a next query.

20. The computer program product of claim 17, wherein the primary cluster is further configured to:

send information to the identified at least one secondary cluster to enable the identified at least one secondary cluster to execute the query and send a query result to the client; and disconnect with the client that sent the query to prepare for receipt of a next query.

* * * * *